July 1, 1958 R. GLASER 2,841,356
COPYING MACHINE TOOL
Original Filed Sept. 8, 1953 6 Sheets-Sheet 1

INVENTOR.
BY Rolf Glaser

July 1, 1958

R. GLASER 2,841,356

COPYING MACHINE TOOL

Original Filed Sept. 8, 1953

INVENTOR.
Rolf Glaser
BY
Sanderoth, Lind & Ponack
Attorneys

July 1, 1958 R. GLASER 2,841,356
COPYING MACHINE TOOL
Original Filed Sept. 8, 1953 6 Sheets-Sheet 4

INVENTOR.
ROLF GLASER
BY
Hinderoth, Lind & Ponack
Attorneys

July 1, 1958  R. GLASER  2,841,356
COPYING MACHINE TOOL
Original Filed Sept. 8, 1953  6 Sheets-Sheet 5

INVENTOR.
Ralf GLASER
BY
Henderoth, Lind & Ponack
Attorneys

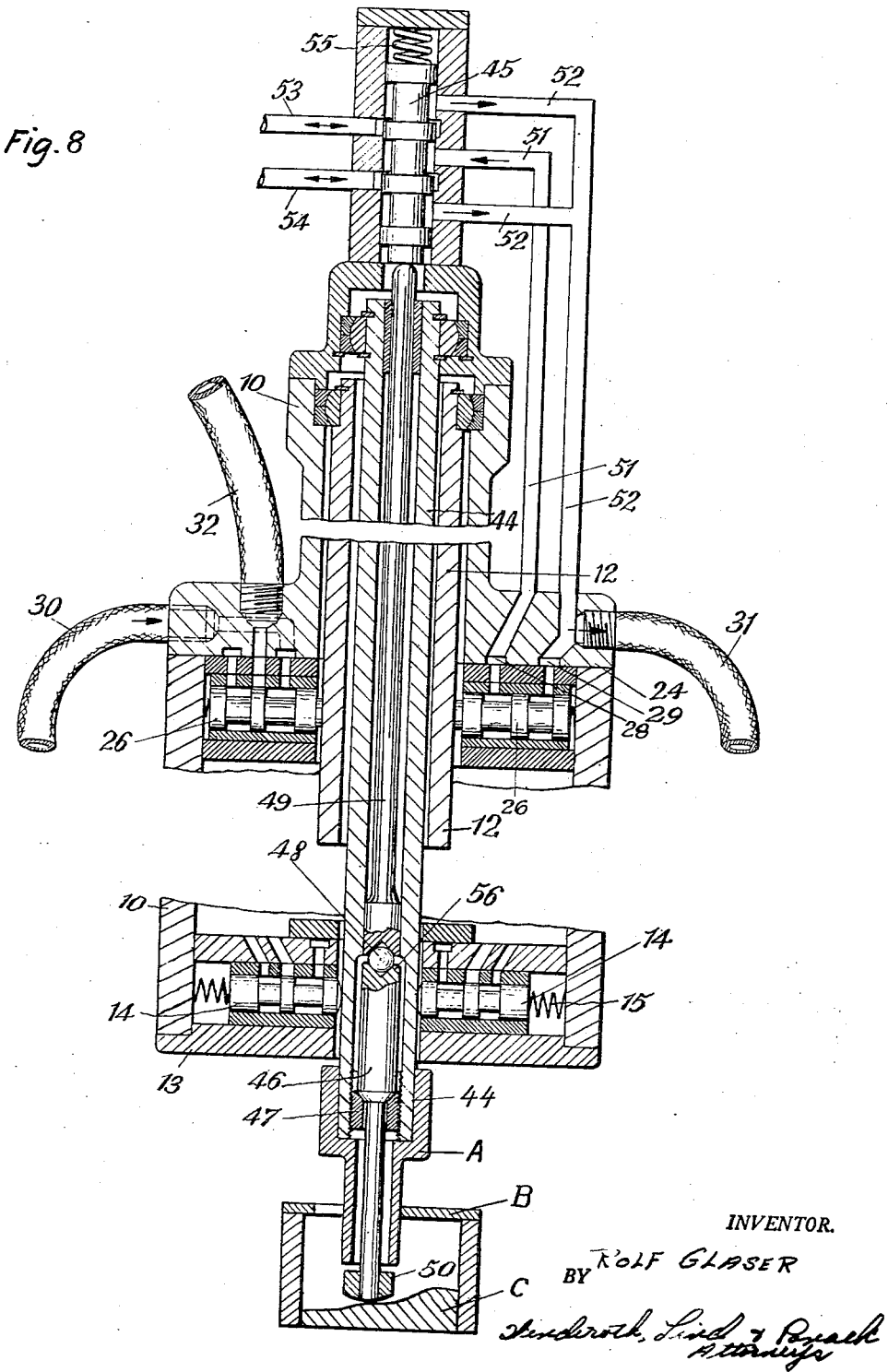

United States Patent Office 2,841,356
Patented July 1, 1958

2,841,356
COPYING MACHINE TOOL

Rolf Glaser, Rorschach, Switzerland, assignor to Starrfrasmaschinen A. G., Rorschacherberg, Switzerland, a Swiss company Continuation of application Serial No. 379,048, September 8, 1953. This application October 26, 1956, Serial No. 618,632

Claims priority, application Switzerland September 10, 1952

12 Claims. (Cl. 251—3)

The present invention relates to a hydraulically operated control device for a copying machine tool for copying inner and outer contours, comprising a working table to be moved by at least two working pistons and a guide finger adapted to cooperate with the pattern.

This application is a continuation of my application Serial No. 379,048, filed September 8, 1953, now abandoned.

The control device according to the present invention is characterized by the provision of means for causing the movements of the work relative to the tool by the contact pressure of the pattern on the guide finger through an intermediate pressure fluid and for directing these movements according to the direction of pressure.

Preferably this is obtained by suspending the guide finger as a pendulum in a control tube itself suspended as a pendulum, which guide finger actuates, when pivoted out of its middle position, some of a number of spring-loaded preliminary control slide valves arranged radially around said guide finger and connected to each other by a common pressure source. This results in the corresponding pressing pistons of a number of pressing pistons arranged radially around the control tube, and which are connected with the preliminary control slide valves, pivoting the control tube in the opposite direction, whereby the latter actuates at least one of four control slide valves being hydraulically connected with the working pistons of the working table.

Thereby the preliminary control slide valves and the pressing pistons form a common pressure system which can be connected to a common low pressure source. Said pressure system may be a hydraulic as well as a pneumatic one.

The transmission of the deflections of the preliminary control slide valves may also be accomplished electromagnetically.

Preferably the pressing pistons are arranged on an annular flange around the control tube, which flange may be rotated to a certain extent by a handle, in order to adjust or change the direction of movement of the pattern with respect to the guide finger. The pattern may thus be moved forwardly at an adjustable angle with respect to the contact surface, so that the guide finger slides along the contour of the latter and a continuous contact and simultaneously a continuous sliding is guaranteed.

An embodiment of the present invention is shown together with some variants, in the annexed drawings in which:

Fig. 8 is a vertical section through a control head, the guide finger of which is provided with an additional tiptracer device for three dimensional copying.

Figure 1:
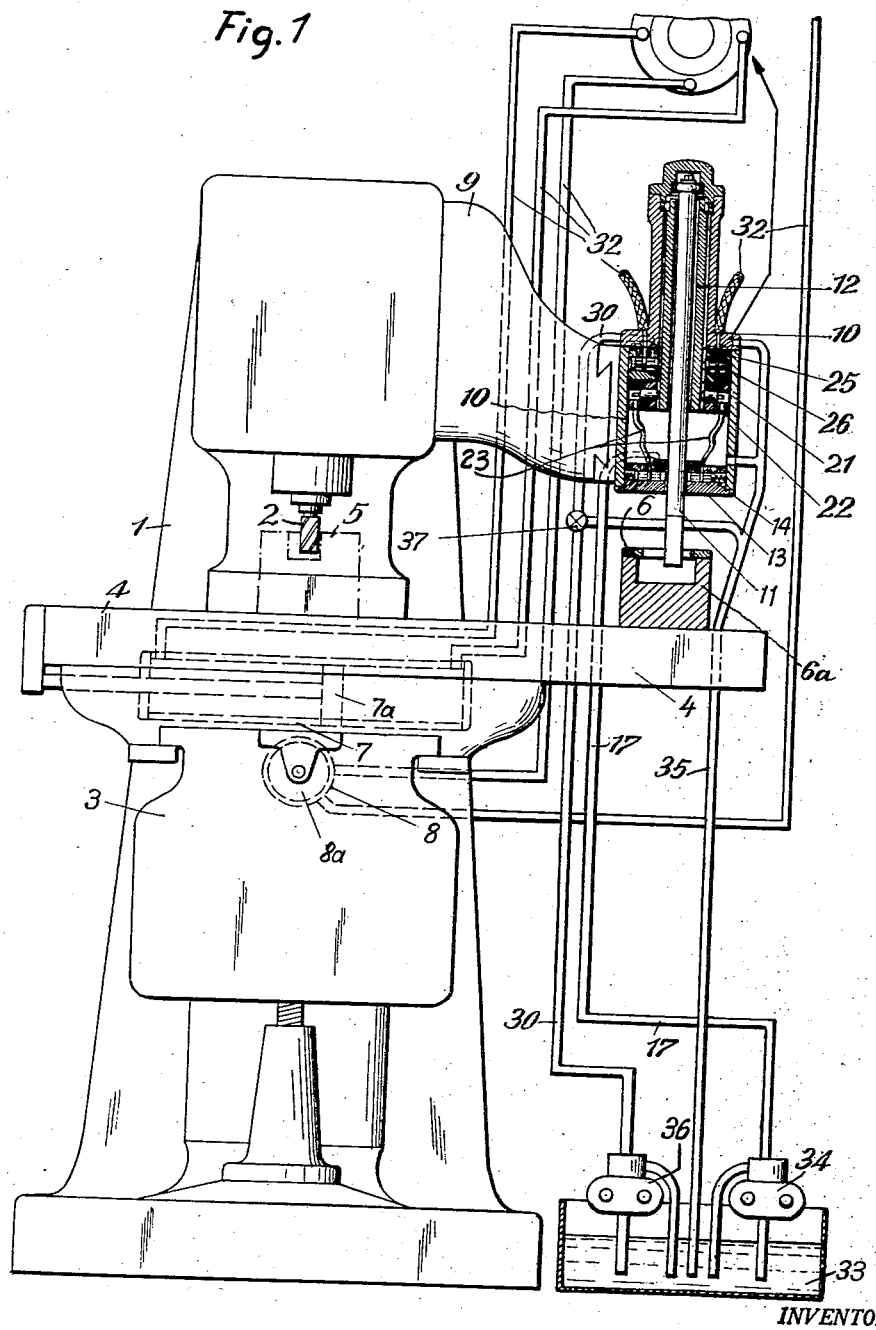
Fig. 1 is an elevation view, partly in section and partly schematic, of a copying milling machine showing in section a hydraulically operating control device and the conduits therefor. The connection of the conduits for the pressure means to control 24 is shown from above.

The frame 1 of the copy milling machine (Fig. 1) has at its working head a rigidly mounted milling device with the milling tool 2, and on a block 3, the height of which may be adjusted by means of a screw spindle, is the working table 4 on which are rigidly clamped the work 5 and, by means of a pattern holder 6a, the pattern 6. The working table 4 is connected to the block 3 by two working cylinders 7, 8 and their pistons 7a, 8a, by means of which the table may be moved in longitudinal and transverse directions with respect to the milling tool.

An arm 9 has thereon the control head of the copy milling machine. In the housing 10 of this head a guide finger 11 is suspended in pendulum suspension in such a way that it may swing freely in a control tube 12, which is pivotally suspended in the housing 10. The guide finger is longer than the control tube and projects beyond the bottom of the housing 10 so as to be able to cooperate with the exchangeable pattern 6.

Figure 2:
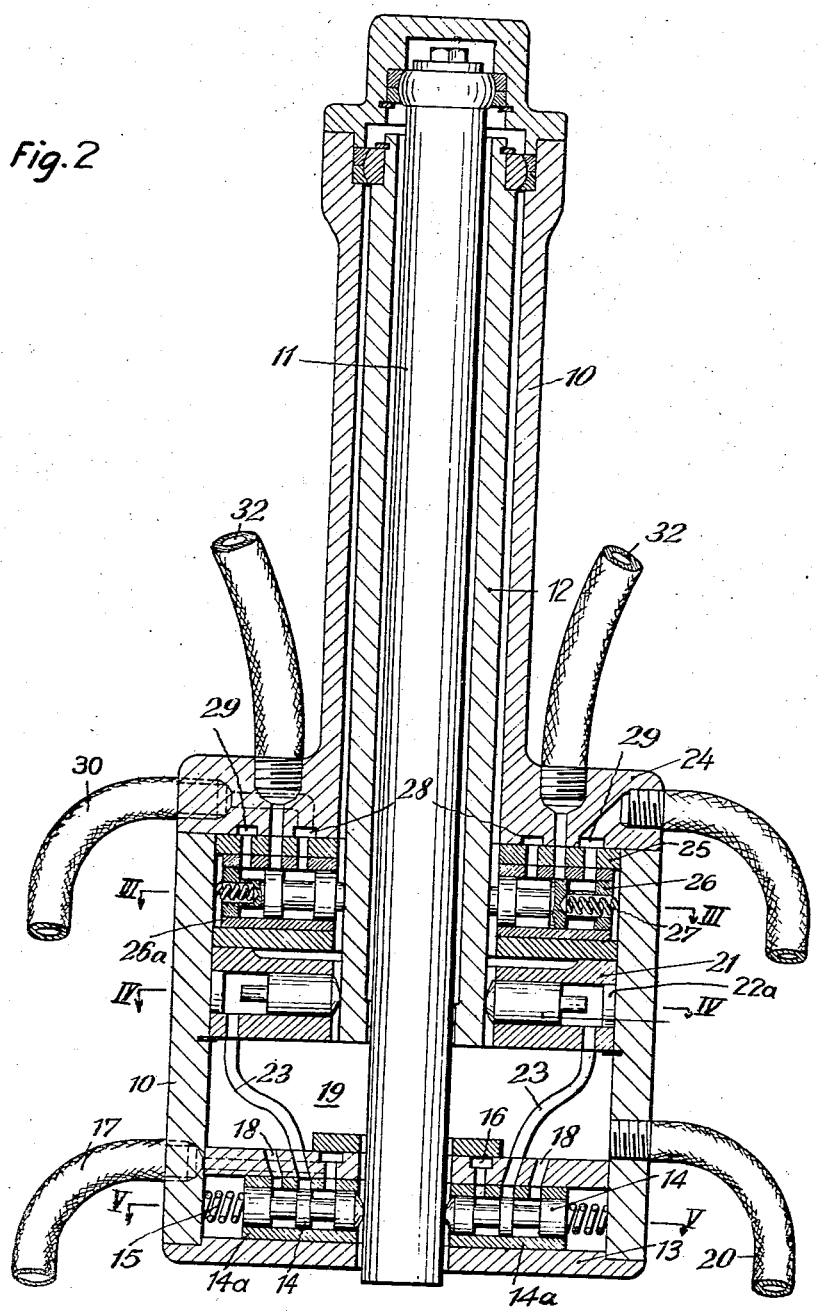
Fig. 2 is an enlarged vertical section through the control head of the machine.
Figure 5:
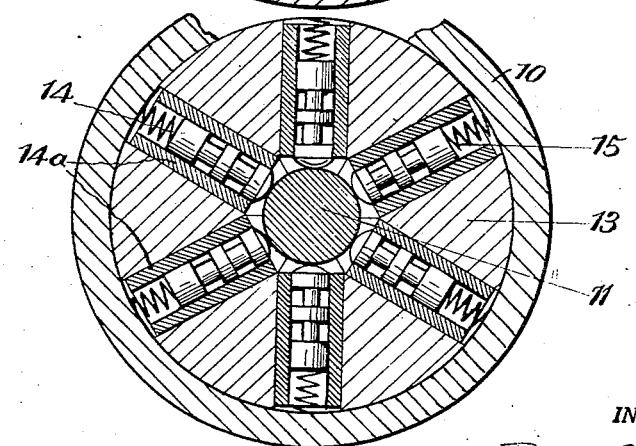
Fig. 5 is a horizontal section along the line V—V of Fig. 2 showing the preliminary control slide valves.

In the flange 13, which forms the bottom of the housing 10, a plurality, in the present case six, of preliminary control slide valves 14 are radially disposed around the guide finger, each in a guiding sleeve 14a. Each is radially shiftable in the guiding sleeves and all are continuously pressed against the guide finger by springs 15 (Figs. 2, 5). The guiding sleeves 14a are connected to each other by an annular channel 16 (Fig. 2) through which the pressure-fluid coming from the conduit 17 is distributed to them. The sleeves 14a are further connected by channels 18 (Fig. 2) to an annular space 19 (Fig. 2), from which the pressure fluid may be discharged through the conduit 20.

Figure 4:
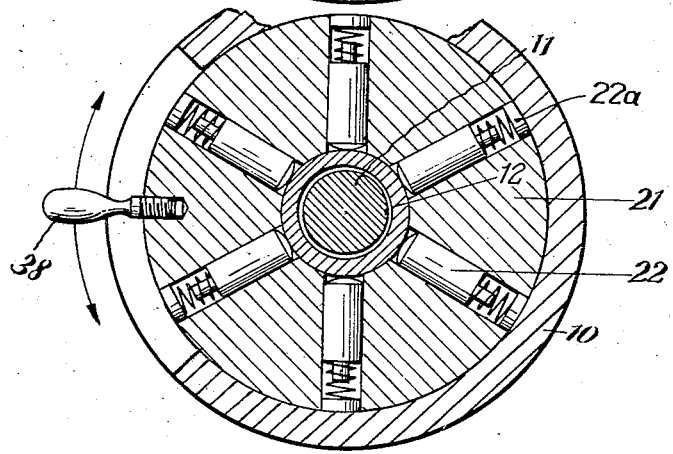
Fig. 4 is a horizontal section along the line IV—IV of Fig. 2 showing the pressing pistons.

A number of pressing pistons 22 corresponding to the number of preliminary control slide valves are arranged radially around the control tube 12 in a flange 21 pivotable to a certain extent in the housing 10 (Fig. 4). Each of these pistons 22 is movable radially in flange 21 and each is associated with a preliminary control slide valve 14 and connected to the guiding sleeve 14a by a flexible pipe 23 (Fig. 2).

Under the action of the pressure fluid held under constant pressure, the pistons 22 continuously contact the control tube 12. The borings serving as guidings for the pistons 22 are closed by stoppers 22a which prevent discharge of the pressure fluid through this end of the borings.

Figure 3:
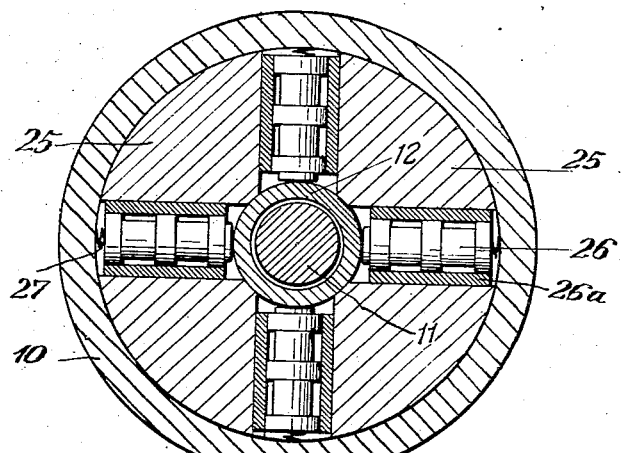
Fig. 3 is a horizontal section along the line III—III in Fig. 2 showing the control slide valves.

A flange 25 is fixed to the cover 24 above the pressing pistons 22 and carries four control slide valves 26 radially movable in guiding sleeves 26a around the control tube 12. These slide valves 26 are continuously pressed against said control tube 12 by springs 27 (Figs. 2, 3).

The guiding sleeves of the control slide valves 26 are connected to each other by an inner annular channel 28 (Fig. 2) and by an outer annular channel 29, the first serving to feed the pressure fluid from the conduit 30 and the second serving to discharge the fluid through conduit 31.

The guiding sleeves of the control slide valves are connected by a conduit 32 passing through the cover 24 to one end of a working cylinder 7, 8, respectively (Fig. 1), the connection being such that two diametrically opposed control slide valves influence only one of the working pistons 7a, 8a (Fig. 1).

The tank for the pressure fluid, for example oil, is designated by reference numeral 33 (Fig. 1). A low pressure pump 34 (Fig. 1) continuously feeds pressure fluid from this tank into the conduit 17 and through the latter to the common low pressure system formed by the pressing pistons and the preliminary control slide valves, while the return flow of the pressure fluid passes through the conduit 20 (Fig. 2) into the return conduit 35 and through the latter flows directly back into the tank 33 (Fig. 1) in such a way that a constant pressure is continuously maintained in the low pressure system.

On the other hand a high pressure pump 36 feeds the pressure system connecting the control slide valves 26 with the working cylinders 7, 8 in Fig. 1, with pressure fluid from the same tank 33 through a conduit 30 into which is interconnected an overflow valve 37 (Fig. 1). The return flow to the tank takes place through a conduit 29 (Fig. 2) and the return conduit 35 (Fig. 1). The low and high pressure system could also be provided with pressure fluid by one and the same high pressure pump to which the low pressure conduit could be connected through a reduction valve.

It may be seen from the foregoing that at each swinging of the guide finger out of its middle position it presses outwardly, against the action of the springs 15, those of the preliminary control slide valves 14 (Figs. 2–5), which are in the direction of this swinging movement. Thereby the corresponding conduits 23 are more or less liberated, i. e. there openings for the passage in the guiding sleeves 14a are more or less opened so that the pressing pistons 22 associated with these preliminary control slide valves pivot the control tube 12 in the opposite direction. The latter thereby actuates the control slide valves 26 lying in its direction of pivoting against the action of springs, which according to their respective positions with respect to the direction of movement of the control tube open the corresponding high pressure conduits 32 (Figs. 1, 2) and feed the pressure fluid according to the displacement of the control slide valves to the working cylinders 7, 8 respectively (Fig. 1), resulting in the working pistons 7a, 8a respectively, shifting the working table 4 in the opposite direction with respect to the movement of the guide finger 11.

This shifting movement, which simultaneously moves the work with respect to the milling tool and the pattern with respect to the guide finger, lasts until the position of the control slide valves is changed due to a change of direction of the contour of the pattern or for another reason (e. g. pulling of the guide finger).

The copying operation must be started by conducting the pattern 6 (Fig. 1) to the guide finger 11. This may be obtained by pivoting the guide finger 11 out of its middle position resulting in a movement of the working table in the opposite direction to the deflection of the guide finger, until the pattern 6 contacts the latter (Fig. 1). Thereby the control tube 12 with the control slide valves 26 is shifted until the latter are in their middle position again and the working pistons stand still.

In this position the preliminary control slide valves 14 are in such a position that the corresponding working pistons 22 are continuously pressed against the control tube 12 and the guide finger 11 against the pattern 6. By means of a handle 38 (Fig. 4) projecting out of the housing 10 the flange 21 may be rotated to a certain extent resulting in a rotation of the pressing pistons 22 with respect to the position of their associated preliminary control slide valves 14. Thereby the pressure against the control tube 12, which ordinarily acts vertically to the contact surface of the pattern 6, is displaced by the same angle through which the flange 21 has been rotated, so that the control tube 12 is shifted in such a way that the pattern is no longer moved against the movement of the guide finger 11 but obliquely to the latter, thereby guaranteeing a continuous contact and simultaneously a continuous sliding. As, however, the guide finger deflects always at right angles to the contact point of the pattern 6, each change of direction of the surface of the pattern moves other preliminary control slide valves, so that the direction of pressure changes according to the contour of the pattern resulting in the latter turning around the guide finger.

The process is reversed when the flange 21 is pivoted in the direction with respect to the preliminary control slide valves.

The rate of feed may be adjusted by changing the delivery of the hydraulic transmission system, for example by placing either a throttle valve or a regulating pump in the conduit 30.

The cooperation of the guide finger 11 with the pattern 6 may be interrupted by pulling the guide finger 11 in the direction of its deflection and against the pressure exerted thereon. By suitable swinging of the guide finger the working table may be brought into any convenient position. The operation of the working pistons 7a, 8a may furthermore be interrupted at any time by opening the overflow valve 37 in Fig. 1.

Figure 6:
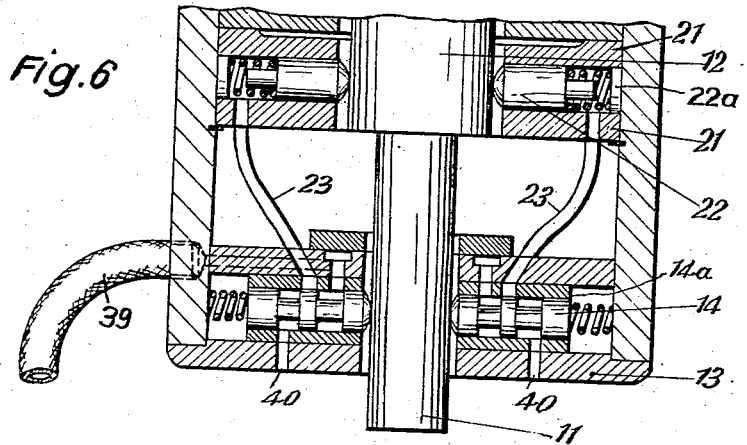
Fig. 6 is a partial vertical section showing another embodiment with pneumatically controlled preliminary control.

As shown in Fig. 6 the preliminary control may also be actuated pneumatically by feeding compressed air instead of liquid under pressure through the conduit 39 in Fig. 6, the discharge of the compressed air taking place through discharge channels 40 directly into the atmosphere. The interconnection of the preliminary control slide valves 14 by the annular channel 16 as well as the arrangement of the pressing pistons 22 and their connecting conduits 23 with the preliminary control slide valves is the same as described above with respect to the hydraulically operated system.

Figure 7:
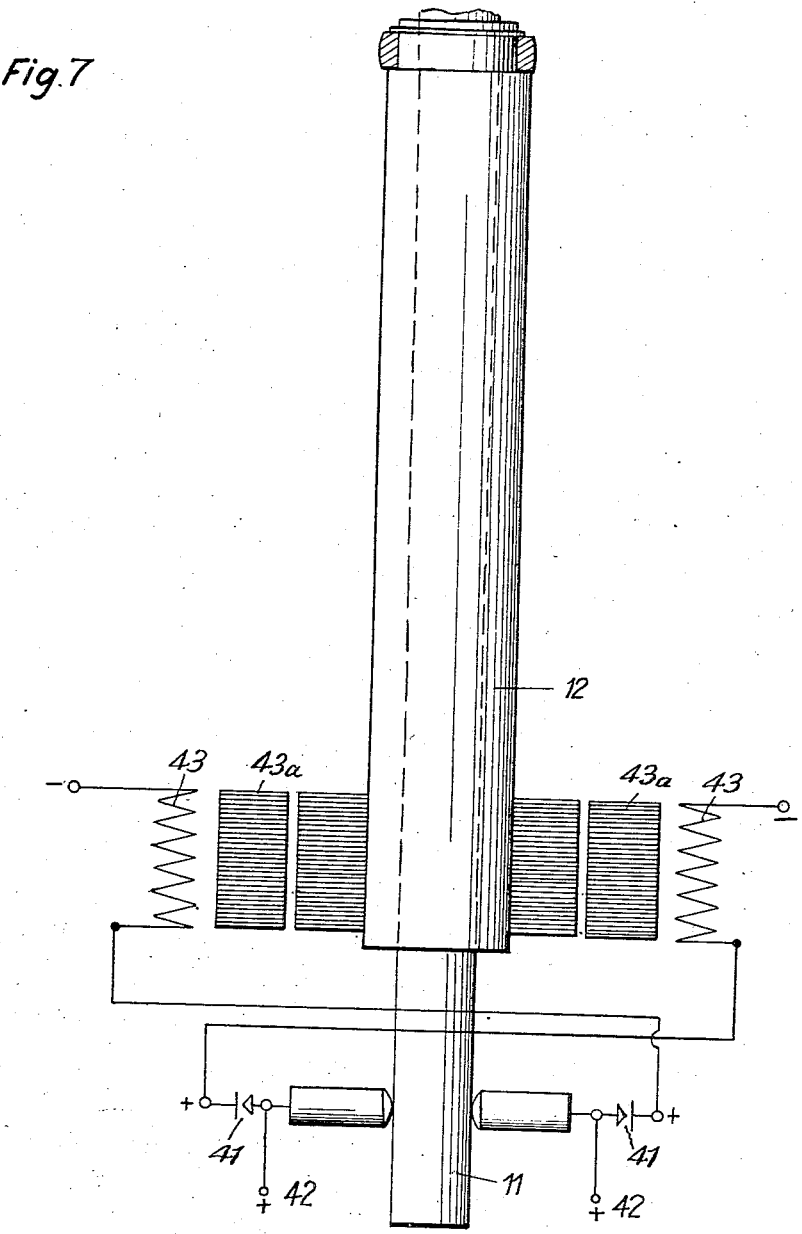
Fig. 7 shows diagrammatically another embodiment with electrical preliminary control.

As shown in Fig. 7 the preliminary control can also be operated electromagnetically. In this case the guide finger 11, when pivoted, actuates a number of electrical contacts 41 connected at 42 to a source of current. These contacts 41 are connected to a similar number of field coils 43 with magnet cores 43a, which are arranged around the control tube 12, the latter being formed as an armature for cooperation with said field coils.

It is also possible to provide a control device permitting copying of three dimensional contours with one and the same guide finger. The control head of such a device is shown in Fig. 8.

In this particular case the guide finger is hollow and provided with an additional tip-tracer device acting hydraulically upon a third working piston through an additional control slide valve 45 for vertical displacement of the working table.

The tip-tracer 46 is pivotally mounted in a bearing sleeve 47, which is adjustable vertically by means of a threaded outer surface, and has a ball 48 and a rod 49 bearing against one end thereof. The rod 49 has a control slide valve 45 bearing thereagainst. The tip-tracer 46 head slides on the pattern C.

The control slide valve 45 has three chambers into the middle one of which opens the feeding conduit 51 for the pressure fluid, while the two exterior chambers are each connected to a return conduit 52. Two pressure conduits 53 and 54 are each connected with one end of the working cylinder for the vertical displacement of the working table, the pressure fluid flowing through these conduits, depending on the position of the control slide valve 45, either in one or in the other direction. A spring 55 is adapted to cause a constant contact pressure between the tracer 46 and the pattern C.

Here again the copying operation must be started by bringing the pattern into contact with the tracer head 50. For this purpose a lock (not shown) for the rod 49 is released, whereupon the spring 55 moves the control slide valve, the rod 49 and the tip-tracer 46 into the position in which the tip-tracer 46 rests upon the lowermost zone of the bearing sleeve 47. This position is represented in Fig 8. Thus the conduit 54 is liberated and the pressure fluid flows to the working cylinder shifting the working piston in such a way that the working table 4 (Fig. 1) is lifted with the work and the patterns B, C until the latter contacts the tracer head 50 and moves the latter upwardly until the slide valve 45 is in its middle position and closes the conduits 53 and 54.

This middle position is maintained during the now automatic copying as long as the tracer head 50 slides along a horizontal contour of the pattern C lying in a plane normal to the middle axis of the tracer 44. In this position the tip-tracer 46 is held by an upper zone of the bearing sleeve 47 so that it is only pivotable laterally, while it is vertically shiftable to a limited extent.

If the contour of the pattern C ascends relatively to the sliding direction of the tracer 6, the control slide valve 45 is shifted upwardly. Thereby the conduit 35 is opened and the pressure fluid flowing into the working cylinder causes a corresponding lowering of the working table.

A recess in the contour of the pattern causes a lowering of the control slide valve and thus a lifting of the working table. The speed of the vertical movement depends on the inclination of the corresponding portion of the contour of the pattern C.

If the inclination of the contour of the pattern C exceeds a certain measure, or if the latter is unusually rough, the tracer head is pressed sidewardly, whereby one side of the rim of the funnel 56 is pressed against the middle axis of the tracer. The ball 48 being in its middle position in this funnel, escapes upwardly after a slight rotation and pushes the rod 49 and with it the control slide valve 45 upwardly. Due to this particular pressure connection the correct function of the control slide valve 45 is guaranteed even for steepest contours of the pattern C and for roughest surface thereof.

As shown in Fig. 8 the pressure fluid for the hydraulic transmission of the control movements is taken from the two dimensional system and also returned to the latter after use, as the conduits 51, 52 are connected through the cover 24 with the annular channels 28 and 29. Thereby the rate of feed of the horizontal movement at steep contours of the pattern C is reduced.

The control head according to Fig. 8 is adapted to the two dimensional copying work in the same way as the control head according to Fig. 2, as is indicated by the control slide valves 26, preliminary control slide valves 14 and the conduits 30, 31 and 32.

Figure 9:
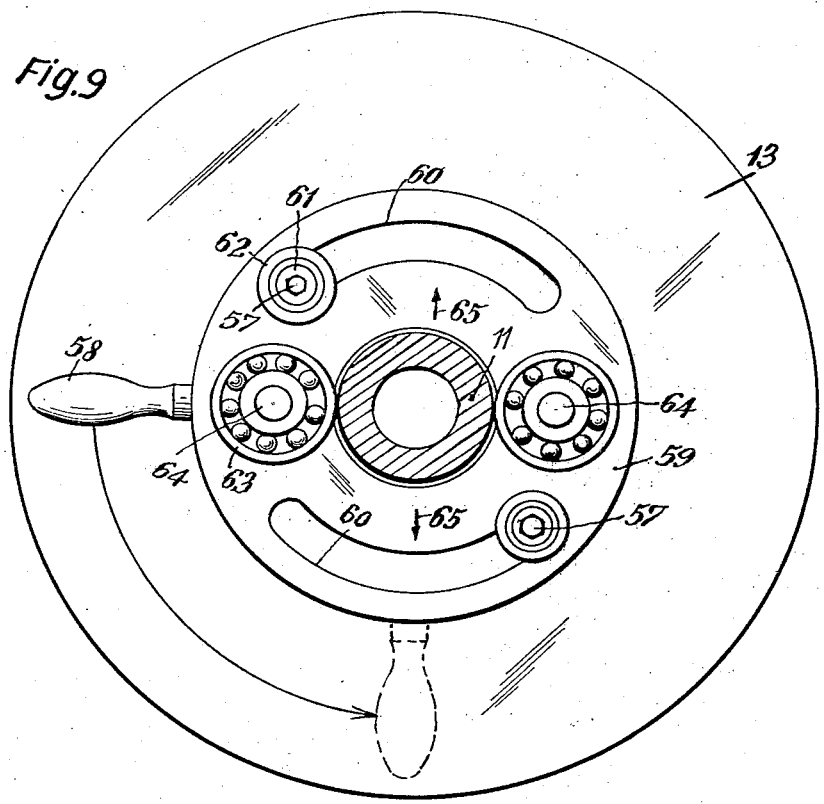
Fig. 9 is a view from below of a device for partially locking the guide finger.

In order to be able to copy in the longitudinal or transversal direction only, on large working pieces, the dimensions of which exceed in one or the other direction the length of the piston stroke, there may be a locking device provided, by means of which the guide finger may be guided in such a way that it is pivotable in one direction only. Fig. 9 shows such a locking device seen from below. This locking device may be fixed to the bottom 13 of the control head by means of two screws 57. A circular flange 59 provided with a handle comprise two concentrically arranged arc-shaped slots 60, by means of which it is guided on two rolls 61 provided on the screws 57. The portion of the rolls projecting beyond the flange 59 are surrounded by two discs 62 which hold the flange against movement in the axial direction. Two rings 63 are provided on roller bearings on two bolts 64 arranged diametrically on the flange 59, in such a way that they bear against the guide finger at opposite sides thereof so that the latter can only pivot in one direction indicated by arrows 65 in Fig. 9. By means of the handle 58 the flange 59 may be turned through 90° so that it is possible to select the direction in which the guide finger shall be pivotable.

In this particular case the feed of the work and of the pattern in one direction is effected independently of the contour of the pattern by any suitable mechanical or hydraulic means. It may for example consist of a slow rotational movement whereby the work and the pattern are mechanically coupled for example by means of worm gears.

For selectively stopping one of the working pistons in addition to the one-sided locking of the guide finger the pair of pressure conduits associated with this working piston is also closed. Thereby the copying of large curve contours, for which the transversal stroke of the milling machine would not suffice, is rendered possible.

I claim:

1. An improvement in a hydraulic control device for hydraulic connection to the working pistons of a working table of a copying machine tool having a tracer assemblage comprising a pattern and a hollow guide finger for cooperation with the pattern for copying inner and outer contours, said improvement comprising a pivotally suspended control tube surrounding the guide finger suspended in pendulum suspension therein, a number of springloaded preliminary control slide valves arranged radially around the guide finger and adapted to be actuated when the guide finger is pivoted out of its middle position, a pressure source, means for connecting said preliminary control slide valves to each other and to said pressure source, a number of pressing pistons one associated with each of said preliminary control slide valves, each pressing piston arranged radially around said control tube and contacting said control tube on a radius angularly displaced relative to the radius on which the corresponding preliminary control slide valve is arranged, means for pressure-connecting said pistons to said preliminary control slide valves so that pivotal deflection of the guide finger causes a pivotal deflection of said control tube, springloaded control slide valves, means for actuating by a deflection of said control tube at least one of said control slide valves, a tip-tracer device vertically movable within the hollow guide tube and bearing against one of said control slide valves, and hydraulic connecting means for said control slide valves.

2. An improvement in a hydraulic control device for hydraulic connection to the working pistons of a working table of a copying machine tool having a tracer assemblage comprising a pattern and a guide finger for cooperation with the pattern for copying inner and outer contours, said improvement comprising a pivotally suspended control tube surrounding the guide finger suspended in pendulum suspension therein, a number of springloaded preliminary control slide valves arranged radially around the guide finger and adapted to be actuated when the guide finger is pivoted out of its middle position, a pressure source, means for connecting said preliminary control slide valves to each other and to said pressure source, a number of pressing pistons one associated with each of said preliminary control slide valves, each pressing piston arranged radially around said control tube and contacting said control tube on a radius angularly displaced relative to the radius on which the corresponding preliminary control slide valve is arranged, means for pressure-connecting said pistons to said preliminary control slide valves so that pivotal deflection of the guide finger causes a pivotal deflection of said control tube, springloaded control slide valves, means for actuating by a deflection of said control tube at least one of said control slide valves, and hydraulic connecting means for said control slide valves.

3. An improvement in a hydraulic control device for hydraulic connection to the working pistons of a working table of a copying machine tool having a tracer assemblage comprising a pattern and a guide finger for cooperation with the pattern for copying inner and outer contours, said improvement comprising a pivotally suspended control tube surrounding the guide finger suspended in pendulum suspension therein, a number of springloaded preliminary control slide valves arranged radially around the guide finger and adapted to be actuated when the guide finger is pivoted out of its middle position, a low pressure source, means for connecting said preliminary control slide valves to each other and to said low pressure source, a number of pressing pistons equal to the number of the preliminary control slide valves, one associated with each of said preliminary control slide valves, forming with said preliminary control slide valves a common pressure system connected to said low pressure source, each of said pistons being arranged radially around said control tube and contacting said control tube on a radius angularly displaced relative to the radius on which the corresponding preliminary control slide valve is arranged, means for pressure-connecting said pistons to said preliminary control slide valves so that pivotal deflection of the guide finger causes a pivotal deflection of said control tube, springloaded control slide valves, means for actuation by a deflection of said control tube at least one of said control slide valves and hydraulic connecting means for said control slide valves.

4. An improvement in a hydraulic control device for hydraulic connection to the working pistons of a working table of a copying machine tool having a tracer assemblage comprising a pattern and a guide finger for cooperation with the pattern for copying inner and outer contours, said improvement comprising a pivotably suspended control tube surrounding the guide finger suspended in pendulum suspension therein, a number of springloaded preliminary control slide valves arranged radially around the guide finger and adapted to be actuated when the guide finger is pivoted out of its middle position, a low pressure source, means for connecting said preliminary control slide valves to each other and to said low pressure source, a number of pressing pistons equal to the number of the preliminary control slide valves, one associated with each of said preliminary control slide valves, forming with said preliminary control slide valves a common hydraulic pressure system connected to said low pressure source, each of said pistons being arranged radially around said control tube and contacting said control tube on a radius angularly displaced relative to the radius on which the corresponding preliminary control slide valve is arranged, means for pressure-connecting said pistons to said preliminary control slide valves so that pivotal deflection of the guide finger causes a pivotal deflection of said control tube, springloaded control slide valves, means for actuation by a deflection of said control tube at least one of said control slide valves and hydraulic connecting means for said control slide valves.

5. An improvement in a hydraulic control device for hydraulic connection to the working pistons of a working table of a copying machine tool having a tracer assemblage comprising a pattern and a guide finger for cooperation with the pattern for copying inner and outer contours, said improvement comprising a pivotally suspended control tube surrounding the guide finger suspended in pendulum suspension therein, a number of springloaded preliminary control slide valves arranged radially around the guide finger and adapted to be actuated when the guide finger is pivoted out of its middle position, a low pressure source, means for connecting said preliminary control slide valves to each other and to said low pressure source, a number of pressing pistons equal to the number of the preliminary control slide valves, one associated with each of said preliminary control slide valves, forming with said preliminary control slide valves a common pneumatic pressure system connected to said low pressure source, each of said pistons being arranged radially around said control tube and contacting said control tube on a radius angularly displaced relative to the radius on which the corresponding preliminary control slide valve is arranged, means for pressure-connecting said pistons to said preliminary control slide valves so that pivotal deflection of the guide finger causes a pivotal deflection of said control tube, springloaded control slide valves, means for actuation by a deflection of said control tube at least one of said control slide valves and hydraulic connecting means for said control slide valves.

6. The improvement as claimed in claim 2 and a pressure-fluid conduit connected between each pressing piston and each preliminary control slide valve.

7. The improvement as claimed in claim 2 and electrical contacts with which said preliminary control slide valves are connected, whereby the control tube is influenced magnetically.

8. The improvement as claimed in claim 7 and field coils around the control tube formed as an armature, said electrical contacts each being connected to a field coil.

9. The improvement as claimed in claim 2 in which the pressure-fluid for the hydraulic transmission of the movements of the control slide valves to the working pistons is under high pressure.

10. The improvement as claimed in claim 9 and means for feeding both pressure systems from a common container.

11. The improvement as claimed in claim 2 and an annular flange mounted around the control tube, said pressing pistons being arranged on said flange and said flange being rotatable to a limited extent for adjustment and changing of the direction of movement of the pattern with respect to the guide finger.

12. The improvement as claimed in claim 2 and locking means mounted around said guide finger for partially locking the guide finger so that it may pivot in one direction only.

References Cited in the file of this patent
UNITED STATES PATENTS 2,745,624     Turchan _____ May 15, 1956
2,753,145     Rosebrook _____ July 3, 1956